No. 744,263. Patented November 17, 1903.

UNITED STATES PATENT OFFICE.

WILHELM TRAINE, OF WIESBADEN, GERMANY.

PROCESS OF MANUFACTURING OIL-VARNISH.

SPECIFICATION forming part of Letters Patent No. 744,263, dated November 17, 1903.

Application filed February 3, 1903. Serial No. 141,785. (No specimens.)

*To all whom it may concern:*

Be it known that I, WILHELM TRAINE, a citizen of the Confederation of Switzerland, and a resident of 9 Lessingstrasse, Wiesbaden, in the Province of Hesse-Nassau, German Empire, have invented a new and Improved Process of Manufacturing Oil-Varnishes, of which the following is an exact specification.

My invention relates to a process of manufacturing oil-varnishes, and is based upon the discovery that the solubility of naphthalene in fat oils—as, for instance, linseed-oil—can be considerably increased by the addition of resin or resin products. The resin may be immediately mixed with the naphthalene and added to the linseed or the like oil in this form, or the resin may be dissolved in the fat oil and the naphthalene may be added afterward to this resin solution. The relatively small solubility of the naphthalene is hereby increased considerably. The process has the great advantage that the consistency of the product gets much lighter by the addition of the naphthalene and that, furthermore, the varnish does not get turbid by the addition of siccatives, but remains perfectly clear, like boiled varnishes, which is not the case when the siccatives are added to the raw uncooked oil without any addition of naphthalene.

In order to make my process more clear, I will proceed to describe the same at the hand of the following examples:

One hundred parts of linseed-oil, fifty parts of resin, and one-hundred parts of turpentine-oil are mixed, and twenty-five parts of naphthalene are added to this mixture. It is naturally perfectly indifferent whether at first the three first components are mixed, whereafter the naphthalene is added, or whether the resin and the naphthalene are mixed and this mixture is afterward dissolved in a mixture of linseed-oil and turpentine-oil.

The process is very important in the manufacture of siccatives, as by the addition of the naphthalene a siccative is obtained which when dissolved in linseed-oil or the like furnishes a varnish which is perfectly clear and thinly liquid and which gets easily dry.

The siccative is manufactured of resin-oil, resin, and oxid of lead or manganese under the addition of naphthalene. By the addition of naphthalene the siccative gets thinner liquid, and in consequence hereof and also in consequence of its other properties obtained by the addition of the naphthalene it easily dissolves in cold linseed-oil, which is very difficult if a siccative without naphthalene is used. While, furthermore, the resin solutions which do not contain any naphthalene produce a dark color when boiled with the drying-oils, the addition of naphthalene to the lead and manganese resin solutions effects that the color of the raw linseed-oil or of the varnish obtained by cooking the drying-oils with the resin solution and diluting with turpentine-oil is not changed at all, but remains exactly the same as if no coloring-oxids had been used at all. A further advantage consists in the drying capacity of the varnishes being greatly augmented.

It will be understood that by means of this process also the so-called "siccative" varnishes can be manufactured, which do not contain any linseed-oil, but consist only of resin and turpentine-oil. For these latter varnishes the process offers the same advantages as for the linseed-oil varnishes mentioned above.

Having thus fully described the nature of this invention, what I desire to secure by Letters Patent of the United States is—

1. Process of manufacturing varnishes, consisting in mixing the fat or etheric oils to be used with resin and naphthalene, substantially as described and for the purpose set forth.

2. Process of manufacturing varnishes, consisting in mixing the oils to be used with a siccative consisting of resin-oil, resin, a metallic oxid and naphthalene, substantially as described and for the purpose set forth.

In testimony whereof I have signed my name to this specification in the presence of two subscribing witnesses.

WILHELM TRAINE.

Witnesses:
MAX FRITZSCHE,
HUGO KOELER.